(12) United States Patent
Cheng et al.

(10) Patent No.: US 11,587,250 B2
(45) Date of Patent: Feb. 21, 2023

(54) METHOD FOR QUANTITATIVELY IDENTIFYING THE DEFECTS OF LARGE-SIZE COMPOSITE MATERIAL BASED ON INFRARED IMAGE SEQUENCE

(71) Applicant: UNIVERSITY OF ELECTRONIC SCIENCE AND TECHNOLOGY OF CHINA, Sichuan (CN)

(72) Inventors: Yuhua Cheng, Chengdu (CN); Chun Yin, Chengdu (CN); Xiao Yang, Chengdu (CN); Kai Chen, Chengdu (CN); Xuegang Huang, Chengdu (CN); Gen Qiu, Chengdu (CN); Yinze Wang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 64 days.

(21) Appl. No.: 17/401,760

(22) Filed: Aug. 13, 2021

(65) Prior Publication Data

US 2021/0383563 A1    Dec. 9, 2021

(30) Foreign Application Priority Data

Jun. 21, 2021 (CN) .......................... 202110686316.0
Jun. 21, 2021 (CN) .......................... 202110686339.1

(51) Int. Cl.
*G06T 7/00* (2017.01)
*G06T 3/00* (2006.01)
(Continued)

(52) U.S. Cl.
CPC .............. *G06T 7/62* (2017.01); *G06T 3/0006* (2013.01); *G06T 3/0068* (2013.01);
(Continued)

(58) Field of Classification Search
CPC ... G06T 3/0006; G06T 3/0068; G06T 3/0075; G06T 3/4038; G06T 7/30–38;
(Continued)

(56) References Cited

U.S. PATENT DOCUMENTS

| 10,229,486 B2 | 3/2019 | Gao et al. |
| 10,846,841 B2 | 11/2020 | Cheng et al. |
| 11,036,978 B2 | 6/2021 | Yin et al. |

OTHER PUBLICATIONS

Omar, Tarek, Moncef L. Nehdi, and Tarek Zayed. "Infrared thermography model for automated detection of delamination in RC bridge decks." Construction and Building Materials 168 (2018): 313-327. (Year: 2018).*

\* cited by examiner

*Primary Examiner* — Geoffrey E Summers
(74) *Attorney, Agent, or Firm* — Oliff PLC

(57) ABSTRACT

The present invention provides a method for quantitatively identifying the defects of large-size composite material based on infrared image sequence, firstly obtaining the overlap area of an infrared splicing image, and dividing the infrared splicing image into three parts according to overlap area: overlap area, reference image area and registration image area, then extracting the defect areas from the infrared splicing image to obtain P defect areas, then obtaining the conversion coordinates of pixels of defect areas according to the three parts of the infrared splicing image, and further obtaining the transient thermal response curves of centroid coordinate and edge point coordinates, finding out the thermal diffusion points from the edge points of defect areas according to a created weight sequence and dynamic distance threshold $\varepsilon_{ttr} \times d_{p\_max}$, finally, based on the thermal diffusion points, the accurate identification of quantitative size of defects are completed.

1 Claim, 6 Drawing Sheets

(51) Int. Cl.
*G06T 7/30* (2017.01)
*G06T 7/62* (2017.01)

(52) U.S. Cl.
CPC .......... *G06T 3/0075* (2013.01); *G06T 7/0004* (2013.01); *G06T 7/30* (2017.01); *G06T 7/97* (2017.01); *G06T 2207/10048* (2013.01); *G06T 2207/20221* (2013.01)

(58) Field of Classification Search
CPC . G06T 7/0002–001; G06T 2207/10048; G06T 7/62; G06T 7/97; G06T 2207/20021
See application file for complete search history.

METHOD FOR QUANTITATIVELY IDENTIFYING THE DEFECTS OF LARGE-SIZE COMPOSITE MATERIAL BASED ON INFRARED IMAGE SEQUENCE

FIELD OF THE INVENTION

This application claims priorities under the Paris Convention to Chinese Patent Applications No. 202110686339.1 and 202110686316.0, both filed on Jun. 21, 2021, the entirety of which is hereby incorporated by reference for all purposes as if fully set forth herein.

The present invention relates to the field of Non-Destructive Testing (NDT), more particularly to a method for quantitatively identifying the defects of large-size composite material based on infrared image sequence.

BACKGROUND OF THE INVENTION

High-performance and large-size composite materials are widely used in aerospace field, and their safety has great significance for the operation of spacecraft, therefore it's very necessary to perform non-destructive tests on the composite materials.

For defect detection of large-size composite material, in order to guarantee the accuracy of the detection, it is necessary to perform a plurality of local infrared non-destructive detections on the large-size composite material, and ensure that there is a certain overlap area between two adjacent local detections. Reconstructing the infrared image sequence obtained by a local detection, a local reconstruction image is obtained, which corresponds to the local area of the local detection. Splicing all two adjacent local reconstruction images, an infrared splicing image is obtained, which can present an overall defect detection result of the large-size composite material.

To accurately assess the severity of the damage, we need to know the quantitative size of the defects of a large-size composite material. However, due to the slight deflection of the shooting angle and the horizontal offset between the areas of two adjacent local detections, the local reconstruction image taken as the registration image is needed to be distorted (affine transformed), and then spliced with its adjacent local reconstruction image which is taken as the reference image to obtain a splicing image. The splicing image is taken as a reference image, and further spliced with its adjacent local reconstruction image which is taken as the registration image to obtain a splicing image. Repeatedly splicing the adjacent local reconstruction images, an infrared splicing image is obtained. The splicing of local reconstruction images can make the defect which is not completely detected by a local detection spliced into a whole defect. The defect, especially in overlap area may be distorted, therefore the quantitative size of a defect cannot be accurately obtained by directly counting the number of pixels of corresponding defect area in infrared splicing image.

Meanwhile, the temperature of defect area rises faster than that of non-defect area, so a larger temperature gradient will be formed at the edge of the defect area, which makes the temperature of the part closing to the edge of the defect area rising and forms an edge thermal diffusion effect. The part closing to the edge of the defect area is the thermal diffusion area, which will enlarge the defect area in defect reconstruction image, thus the counting result of pixels cannot accurately reflect the quantitative size of the defect.

In consideration of edge thermal diffusion effect, some scholars choose to conduct defect detection experiments on a designed defect, then use the temperature peak information in the corresponding temperature characteristics, the thermal conductivity of the composite material and the actual defect size to calculate and fit to obtain a fitting formula, and then use the fitting formula to quantitatively identify the defects of composite material. For the reason that different materials have different thermal conductivity coefficients, the method requires a large number of detection experiments

SUMMARY OF THE INVENTION

The present invention aims to overcome the deficiencies of the prior art, and provides a method for quantitatively identifying the defects of large-size composite material based on infrared image sequence to solve the problem of inaccurate counting of pixels, which results from the distortion of defects on overlap area, and edge thermal diffusion effect, and further to realize accurate identification of quantitative size of defects.

To achieve these objectives, in accordance with the present invention, a method for quantitatively identifying the defects of large-size composite material based on infrared image sequence is provided, comprising:

(1). obtaining a plurality of local reconstruction images of a large-size composite material based on a plurality of the infrared image sequences recorded by an infrared thermal imaging camera through a plurality of local detection;

(2). locating the overlap area of two adjacent local reconstruction images 2.1). splicing two adjacent local reconstruction images into an infrared splicing image, and calculating the coordinate supplement values $X_{add}$ and $Y_{add}$ taking a local reconstruction image as reference image $I_1$, and an adjacent local reconstruction image which has overlap area with reference image $I_1$ as registration image $I_2$, putting reference image $I_1$ and registration image $I_2$ into a world coordinate system, and then splicing reference image $I_1$ with registration image $I_2$ by using an affine transformation matrix H to obtain an infrared splicing image $I_{12}$, where the size of reference image $I_1$ and registration image $I_2$ is the same: the width is m pixels, the height is n pixels;

where affine transformation matrix H is:

$$H = \begin{bmatrix} o_1 & o_2 & o_3 \\ o_4 & o_5 & o_6 \\ 0 & 0 & 1 \end{bmatrix};$$

where $o_1, o_2, o_3, o_4, o_5, o_6$ are the coefficients which are determined by pairs of matching pixels of reference image $I_1$ and registration image $I_2$;

calculating inverse matrix $H^{-1}$ according to affine transformation matrix H, and denoted by:

$$H^{-1} = \begin{bmatrix} o'_1 & o'_2 & o'_3 \\ o'_4 & o'_5 & o'_6 \\ 0 & 0 & 1 \end{bmatrix};$$

where $o'_1, o'_2, o'_3, o'_4, o'_5, o'_6$ are the calculated coefficients;

calculating the coordinate supplement values $X_{add}$ and $Y_{add}$ according to affine transformation matrix H and registration image $I_2$:

$X_{add}=0 | X_{min}>0, X_{add}=X_{min} | X_{min} \le 0$ $Y_{add}=0 | Y_{min}>0, Y_{add}=Y_{min} | Y_{min} \le 0$ where:

$$X_{min} = \min_{x}\left\{\begin{bmatrix} o_1 & o_2 \\ o_4 & o_5 \end{bmatrix} \cdot \begin{bmatrix} x_{2\_1} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_1} \\ y_{2\_1} \end{bmatrix} + \begin{bmatrix} o_3 \\ o_6 \end{bmatrix}\right\}$$

$$Y_{min} = \min_{y}\left\{\begin{bmatrix} o_1 & o_2 \\ o_4 & o_5 \end{bmatrix} \cdot \begin{bmatrix} x_{2\_m} \\ y_{2\_1} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_1} \\ y_{2\_1} \end{bmatrix} + \begin{bmatrix} o_3 \\ o_6 \end{bmatrix}\right\}$$

where $(x_{2\_1}, y_{2\_n})$ is the pixel coordinate at column 1 and row n of registration image $I_2$, $(x_{2\_1}, y_{2\_1})$ is pixel coordinate at column 1 and row 1 of registration image $I_2$, $(x_{2\_m}, y_{2\_1})$ is the pixel coordinate at column m and row 1 of registration image $$I_2, \min_{x}$$

denotes choosing the minimal x-coordinate from two pixel coordinates, $$\min_{y}$$

denotes choosing the minimal y-coordinate from two pixel coordinates;

2.2). determining a search rectangle area calculating the maximum x-coordinate $X_{max}$ and the maximum x-coordinate $Y_{max}$ according to affine transformation matrix H and registration image $I_2$:

$$X_{max} = \max_{x}\left\{\begin{bmatrix} o_1 & o_2 \\ o_4 & o_5 \end{bmatrix} \cdot \begin{bmatrix} x_{2\_m} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_m} \\ y_{2\_1} \end{bmatrix} ++ \begin{bmatrix} o_3 \\ o_6 \end{bmatrix}\right\}$$

$$Y_{max} = \max_{y}\left\{\begin{bmatrix} o_1 & o_2 \\ o_4 & o_5 \end{bmatrix} \cdot \begin{bmatrix} x_{2\_m} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} * \begin{bmatrix} x_{2\_1} \\ y_{2\_n} \end{bmatrix} + \begin{bmatrix} o_3 \\ o_6 \end{bmatrix}\right\}$$

where $(x_{2\_m}, y_{2\_n})$ is the pixel coordinate at column m and row n of registration image $I_2$, $(x_{2\_m}, y_{2\_1})$ is the pixel coordinate at column m and row 1 of registration image $I_2$, $(x_{2\_1}, y_{2\_n})$ is the pixel coordinate at column 1 and row n of registration image $$I_2, \max_{x}$$

denotes choosing the maximal x-coordinate from two pixel coordinates, $$\max_{y}$$

denotes choosing the maximal y-coordinate from two pixel coordinates;

judging and determining the values of four vertices: when $X_{min} > 0$, then $X_{min} = 1$, when $X_{min} \leq 0$, then $X_{min} = X_{min}$, when $Y_{min} > 0$, then $Y_{min} = 1$, when $Y_{min} \leq 0$, then $Y_{min} = Y_{min}$, when $X_{max} > m$, then $X_{max} = X_{max}$, when $X_{min} \leq m$, then $X_{max} = m$, when $Y_{max} > n$, then $Y_{max} = Y_{max}$, when $Y_{max} \leq n$, then $Y_{max} = n$;

connecting the four vertices $(X_{max}, Y_{max})$, $(X_{max}, Y_{min})$, $(X_{min}, Y_{max})$, $(X_{min}, Y_{min})$ to form the search rectangle area;

denoting the pixel values of infrared splicing image $I_{12}$ as:

$$I_{12}(x_{12\_i}, y_{12\_j}), i=1, \ldots, M, j=1, \ldots, N$$

$$M = \text{Round}(X_{max} - X_{min})$$

$$N = \text{Round}(Y_{max} - Y_{min})$$

where the width of infrared splicing image $I_{12}$ is M pixels, the height of infrared splicing image $I_{12}$ is N pixels, Round( ) is a function of rounding a number to the nearest integer;

2.3). determining the three parts of the infrared splicing image

①. transforming reference image $I_1$ and registration image $I_2$ to the search rectangle area: with the lower left corner as the origin, along the x-axis and y-axis, putting the pixel values $I_1(x_{1\_i}, y_{1\_j})$, $i=1, \ldots, m, j=1, \ldots, n$ of reference image $I_1$ into the search rectangle area, and extending reference image $I_1$ to the search rectangle area to obtain pixel values $I'_1(x_{1\_i}, y_{1\_j})$, $i=1, \ldots, M, j=1, \ldots, N$, where there is no pixel value on reference image $I_1$, 0 is added in; transforming the pixel values $I_2(x_{2\_i}, y_{2\_j})$, $i=1, \ldots, m, j=1, \ldots, n$ of registration image $I_2$ into the search rectangle area through the affine transformation of $H \cdot I_2(x_{2\_i}, y_{2\_j})$ to obtain pixel values $I'_2(x_{2\_i}, y_{2\_j})$, $i=1, \ldots, M, j=1, \ldots, N$, where there is no pixel value, 0 is added in;

②. initializing $i=1, j=1$;

③. judging whether both of pixel value $I'_1(x_{1\_i}, y_{1\_j})$ and pixel value $I'_2(x_{2\_i}, y_{2\_j})$ are non-zero values, if yes, pixel value $I_{12}(x_{12\_i}, y_{12\_j})$ of infrared splicing image $I_{12}$ is a pixel value of overlap area, if no, pixel value $I_{12}(x_{12\_i}, y_{12\_j})$ of infrared splicing image $I_{12}$ is not a pixel value of overlap area, $i=i+1$;

④. if $i > M$, then $j = j+1$ and returning step ③, or directly returning step ③, until $j > N$, thus all the pixel values of overlap area forms a overlap area denoted by $I_{12\_overlap}$;

dividing infrared splicing image $I_{12}$ into three parts according to overlap area $I_{12\_overlap}$: overlap area $I_{12\_overlap}$, reference image area $I_{12\_1}$ and registration image area $I_{12\_2}$, where reference image area $I_{12\_1}$ is the part of reference area $I_1$ which does not belong to overlap area $I_{12\_overlap}$, registration image area $I_{12\_2}$ is the part of affine image $I'_2$ which does not belong to overlap area $I_{12\_overlap}$, affine image $I'_2$ is obtained through the following transformation:

$$\begin{bmatrix} x'_{2\_i'} \\ y'_{2\_j'} \end{bmatrix} = \begin{bmatrix} o_1 & o_2 \\ o_4 & o_5 \end{bmatrix} \cdot \begin{bmatrix} x_{2\_i} \\ y_{2\_j} \end{bmatrix} + \begin{bmatrix} o_3 \\ o_6 \end{bmatrix}$$

where $(x_{2\_i}, y_{2\_j})$ is the pixel coordinate at column i and row j of registration image $I_2$, $i=1,2,\ldots, m$, $j=1,2,\ldots, n$, $(x'_{2\_i'}, y'_{2\_j'})$ is the pixel coordinate at column i' and row j' of affine image $I'_2$;

(3). extracting the defect areas from infrared splicing image $I_{12}$ 3.1). transforming the pixel values of infrared splicing image $I_{12}$ from RGB color space to L*a*b color space;

3.2). clustering the pixels of infrared splicing image $I_{12}$ into K clusters according to a* and b* color values, retaining the pixels of the cluster which has maximum L* (brightness), discarding the rest pixels; then performing morphological opening and closing operations on infrared splicing image $I_{12}$ to connect adjacent pixels to obtain defect areas $de_1, de_2, \ldots, de_P$, where P is the number of defect areas, for the $p^{th}$ defect area, its number of pixels is denoted by $N_p$;

(4). quantitatively identifying the size of each defect area of infrared splicing image $I_{12}$ 4.1). obtaining the actual number $NR_p$ of pixels of the $p^{th}$ defect area $de_p$ case1: to the $p^{th}$ defect area $de_p$, if all is within reference image area $I_{12\_1}$, all is within overlap area $I_{12\_overlap}$, or one part is within reference image area $I_{12\_1}$ and the other part is within overlap area $I_{12\_overlap}$, then obtaining a conversion coordinates of pixels by using coordinate supplement values $X_{add}$ and $Y_{add}$:

$$\begin{bmatrix} x_{1\_p\_i''} \\ y_{1\_p\_j''} \end{bmatrix} = \begin{bmatrix} x_{12\_p\_i} + X_{add} \\ y_{12\_p\_j} + Y_{add} \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{1\_p\_i''}, y_{1\_p\_j''})$ is the corresponding conversion coordinate of pixel of the $p^{th}$ defect area $de_p$ on reference image $I_1$ at column i" and row j";

case2: to the $p^{th}$ defect area $de_p$, if all is within registration image area $I_{12\_2}$, or one part is within registration image area $I_{12\_2}$ and the other part is within overlap area $I_{12\_overlap}$, then obtaining the corresponding conversion coordinates of pixels of the $p^{th}$ defect area $de_p$ on registration image $I_2$ by transforming the coordinates of pixels of the $p^{th}$ defect area $de_p$, where transforming the coordinates of pixels of the $p^{th}$ defect area $de_p$ is:

$$\begin{bmatrix} x_{2\_p\_i''} \\ y_{2\_p\_j''} \end{bmatrix} = \begin{bmatrix} o'_1 & o'_2 \\ o'_4 & o'_5 \end{bmatrix} \cdot \begin{bmatrix} x_{12\_p\_i} + X_{add} \\ y_{12\_p\_j} + Y_{add} \end{bmatrix} + \begin{bmatrix} o'_3 \\ o'_6 \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{1\_p\_i''}, y_{2\_p\_j''})$ is the corresponding conversion coordinate of pixel of the $p^{th}$ defect area $de_p$ on registration image $I_2$ at column i" and row j";

to case 1 and case 2: obtaining the $p^{th}$ defect area $de'_p$ on reference image $I_1$ or on registration image $I_2$ according to the corresponding conversion coordinates of pixels of the $p^{th}$ defect area $de_p$; extracting the coordinates of pixels of the edge points from the $p^{th}$ defect area $de'_p$ to obtain a edge point coordinate set denoted by $c_p$;

obtaining the centroid coordinate $(x_{p\_cen}, y_{p\_cen})$ of the $p^{th}$ defect area $de'_p$ according to edge point coordinate set $c_p$, and then obtaining the corresponding transient thermal response curve $TTR_{p\_cen}$ from the corresponding infrared image sequence, according to the centroid coordinate $(x_{p\_cen}, y_{p\_cen})$ of the $p^{th}$ defect area $de'_p$;

obtaining the corresponding transient thermal response curve $TTR_{p\_q}$ from the corresponding infrared image sequence, according to the coordinate $(x_{p\_q}, y_{p\_q})$ of pixel of the edge point in edge point coordinate set $c_p$, q is the coordinate serial number, $q=1,2,\ldots,Q_p$, $Q_p$ is the number of the edge points in edge point coordinate set $c_p$;

to transient thermal response curve $TTR_{p\_cen}$ and transient thermal response curve $TTR_{p\_q}$, calculating the temperature change rate of each frame (time) to obtain temperature change sequence $\Delta V_{p\_cen}$ and temperature change sequence $\Delta V_{p\_q}$ respectively;

comparing the temperature change rates of temperature change sequence $\Delta V_{p\_cen}$ and temperature change sequence $\Delta V_{p\_q}$ at each frame to obtain a weighting factor sequence $VT_{p\_q}$, where the value $VT_{p\_q\_t}$ of $t^{th}$ frame is:

$$VT_{p\_q\_t} = |\Delta V_{p\_cen\_t}, \Delta V_{p\_q\_t}|_{1,2,3}, t=1,2,\ldots,T-1$$

$$VT_{p\_q\_t} = 1, t=T$$

where $\Delta V_{p\_cen\_t}$ is the value of temperature change sequences $\Delta V_{p\_cen}$ at $t^{th}$ frame, $\Delta V_{p\_q\_t}$ is the value of temperature change sequences $\Delta V_{p\_q}$ at $t^{th}$ frame; $|\Delta V_{p\_cen\_t}, \Delta V_{p\_q\_t}|_{1,2,3}$ means:

if the difference between $\Delta V_{p\_cen\_t}$ and $\Delta V_{p\_q\_t}$ is less than a change threshold $\varepsilon_\Delta$, then the value $VT_{p\_q\_t}$ of $t^{th}$ frame is 1, if the difference between $\Delta V_{p\_cen\_t}$ and $\Delta V_{p\_q\_t}$ is not less than a change threshold $\varepsilon_\Delta$, and both of $\Delta V_{p\_cen\_t}$ and $\Delta V_{p\_q\_t}$ are positive or negative, then the value $VT_{p\_q\_t}$ of $t^{th}$ frame is 2, if the difference between $\Delta V_{p\_cen\_t}$ and $\Delta V_{p\_q\_t}$ is not less than a change threshold $\varepsilon_\Delta$, and $\Delta V_{p\_cen\_t}$ and $\Delta V_{p\_q\_t}$ have different signs, then the value $VT_{p\_q\_t}$ of $t^{th}$ frame is 3;

creating a weight sequence $\omega_p$ for the $p^{th}$ defect area $de'_p$, to the value $\omega_{p\_t}$ of weight sequence $\omega_p$ at $t^{th}$ frame, if the temperature of the corresponding frame at the corresponding transient thermal curve $TTR_{p\_q}$ is the maximum temperature, then the value $\omega_{p\_t}$ is 1.5, or is 1;

calculating the distance between transient thermal response curve $TTR_{p\_cen}$ and transient thermal response curve $TTR_{p\_q}$:

$$d_{p\_q} = \left[ \sum_{t=1}^{T} \omega_{p\_t} \times VT_{p\_q\_t} \times |TTR_{p\_cen\_t} - TTR_{p\_q\_t}|^2 \right]^{1/2}$$

where $TTR_{p\_cen\_t}$ is the value of transient thermal response curve $TTR_{p\_cen}$ at $t^{th}$ frame, $TTR_{p\_q\_t}$ is the value of transient thermal response curve $TTR_{p\_q}$ at $t^{th}$ frame;

finding out the maximum value from all distances $d_{p\_q}$, $q=1,2,\ldots,Q_p$, which is denoted by $d_{p\_max}$, then judging whether the distance $d_{p\_q}$ between transient thermal response curve $TTR_{p\_cen}$ and transient thermal response curve $TTR_{p\_q}$ is greater than $\varepsilon_{ttr} \times d_{p\_max}$, if yes, then the $q^{th}$ edge point of the $p^{th}$ defect area $de'_p$ is a thermal diffusion point, or is a defect point, where $e_{ttr}$ is a distance coefficient which is greater than 1 and less than 1;

counting up the number $NS_p$ of thermal diffusion points, and then obtaining the actual number $NR_p$ of pixels of the $p^{th}$ defect area $de_p$ of infrared splicing image $I_{12}$: $NR_p = N_p - NS_p$;

case 3: to the $p^{th}$ defect area, if it simultaneously locates on reference image area $I_{12\_1}$, on overlap area $I_{12\_overlap}$ and on registration image area $I_{12\_2}$, then:

4.1.1). obtaining the conversion coordinates of the pixels within reference image area $I_{12\_1}$ and overlap area $I_{12\_overlap}$ as case 1, and then obtaining the number $NS_{p\_1}$ of thermal diffusion points on reference image $I_1$ as case 1 and case 2;

4.1.2). obtaining the conversion coordinates of pixels within registration image area $I_{12\_2}$ and overlap area $I_{12\_overlap}$ as case 2, and then obtaining the number $NS_{p\_2}$ of thermal diffusion points on registration image $I_2$ as case 1 and case 2;

4.1.3). obtaining the conversion coordinates of pixels within overlap area $I_{12\_overlap}$ as case 1, and then obtaining a plurality of transient thermal response curves through the infrared image sequence which corresponds to reference image $I_1$ according the conversion coordinates of pixels;

4.1.4). obtaining the conversion coordinates of pixels within overlap area $I_{12\_overlap}$ as case 2, and then obtaining a plurality of transient thermal response curves through the infrared image sequence which corresponds to registration image $I_2$ according the conversion coordinates of pixels;

4.1.5). calculating the similarity of the two transient thermal response curves which are respectively from the plurality of transient thermal response curves obtained in step 4.1.3 and the plurality of transient thermal response curves obtained in step 4.1.4 and correspond to the same location at overlap area $I_{12\_overlap}$ by using the dynamic time warping algorithm, if the similarity is greater than similarity threshold $SI_{threshold}$, then the corresponding pixel on overlap area $I_{12\_overlap}$ is a consistent pixel;

4.1.6). counting the consistent pixels on overlap area $I_{12\_overlap}$ to obtain the number $NR_{p\_overlap}$ of the consistent pixels on overlap area $I_{12\_overlap}$, thus obtaining the number $NS_p$ of thermal diffusion points of the $p^{th}$ defect area $de_p$ of infrared splicing image $I_{12}$:

$$NS_p = \text{Round}\left(\frac{NS_{p\_1} + NS_{p\_2}}{1 + NR_{p\_overlap}/(N_p - (_{org}NR_{p\_overlap} - NR_{p\_overlap}))}\right)$$

where $_{org}NR_{p\_overlap}$ is the number of the pixels of the $p^{th}$ defect area $de_p$ on overlap area $I_{12\_overlap}$;

obtaining the actual number $NR_p$ of pixels of the $p^{th}$ defect area $de_p$ of infrared splicing image $I_{12}$: $NR_p = N_p - NS_p$;

4.2). calculating the size $S_p$ of the $p^{th}$ defect area $de_p$:

$$S_p = NR_p \times \frac{L \times B}{P_x \times P_y}$$

where L is the width of detection area, B is the height of detection area, $P_x$ is the number of pixels along the width direction of image, $P_y$ is the number of pixels along the height direction of image;

4.3). processing all P defect areas according the step 4.1)~4.2), thus the sizes $S_1, S_2, \ldots, S_P$ of P defect areas $de_1, de_2, \ldots, de_P$ are obtained, the identification of quantitative size of defects are completed.

The objectives of the present invention are realized as follows:

In the present invention i.e. a method for quantitatively identifying the defects of large-size composite material based on infrared image sequence, firstly obtaining the overlap area of an infrared splicing image, and dividing the infrared splicing image into three parts according to overlap area: overlap area, reference image area and registration image area, then extracting the defect areas from the infrared splicing image to obtain P defect areas, then obtaining the conversion coordinates of pixels of defect areas according to the three parts of the infrared splicing image, and further obtaining the transient thermal response curves of centroid coordinate and edge point coordinates, finding out the thermal diffusion points from the edge points of defect areas according to a created weight sequence and dynamic distance threshold $\varepsilon_{ttr} \times d_{p\_max}$, finally, based on the thermal diffusion points, the accurate identification of quantitative size of defects are completed.

Meanwhile, the present invention has the following advantageous features:

(1). In consideration of the defect distortion resulting from the affine transformation, the present invention transforms the defect on infrared splicing image back to original local reconstruction image based on the three parts of the infrared splicing image, thus the inaccuracy of defect pixels is solved;

(2). The present invention integrates the physical property of transient thermal response with the similarity algorithm, and judges whether the edge points of defect areas are thermal diffusion points, and discard the thermal diffusion points to obtain the actual size of the defects. Therefore, no fitting formula is needed, a large number of detection experiments are avoided.

BRIEF DESCRIPTION OF THE DRAWING

The above and other objectives, features and advantages of the present invention will be more apparent from the following detailed description taken in conjunction with the accompanying drawings, in which:

FIG. 5A is a reference image, FIG. 5B is a registration image, FIG. 5C is the infrared splicing image;

FIG. 6A is the infrared splicing image before clustering, retaining and discarding, FIG. 6B is the infrared splicing image after clustering, retaining and discarding;

FIG. 8A is reference image area $I_{12\_1}$, FIG. 8B is registration image area $I_{12\_2}$, FIG. 8C is overlap area $I_{12\_overlap}$;

FIG. 9A is the part of defect area $De_5$ which is within overlap area $I_{12\_overlap}$, FIG. 9B is the corresponding part on reference image $I_1$, FIG. 9C is the corresponding part on registration image $I_2$.

DETAILED DESCRIPTION OF THE PREFERRED EMBODIMENT

Figure 1:
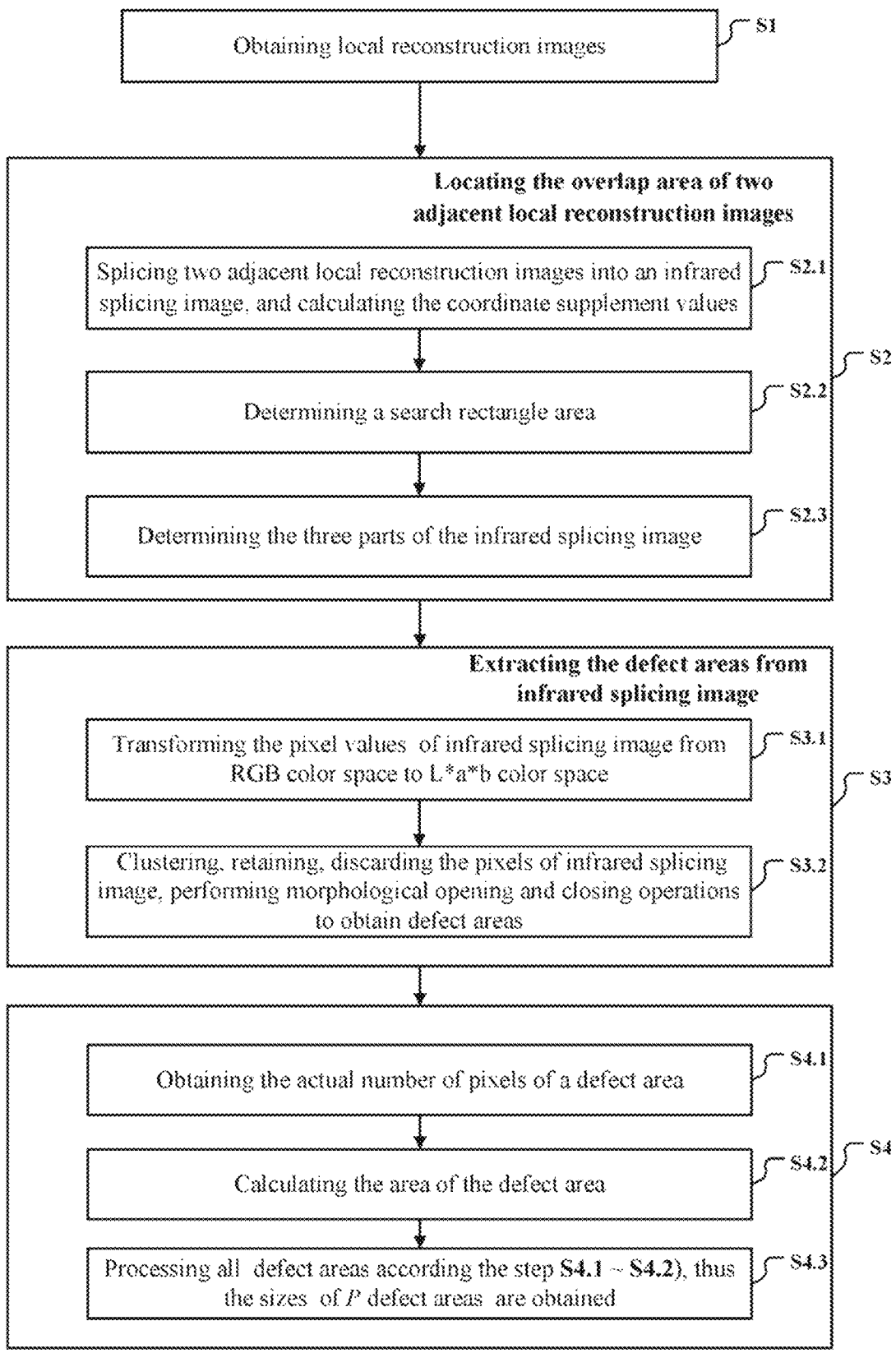
FIG. 1 is a flow diagram of a method for quantitatively identifying the defects of large-size composite material based on infrared image sequence in accordance with the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

FIG. 1 is a flow diagram of a method for quantitatively identifying the defects of large-size composite material based on infrared image sequence in accordance with the present invention.

In one embodiment of the present invention, As shown in FIG. 1, a method for quantitatively identifying the defects of large-size composite material based on infrared image sequence in accordance with the present invention comprises:

Step S1: obtaining local reconstruction images obtaining a plurality of local reconstruction images of a large-size composite material based on a plurality of the infrared image sequences recorded by an infrared thermal imaging camera through a plurality of local detection;

Step S2: locating the overlap area of two adjacent local reconstruction images

Step S2.1: splicing two adjacent local reconstruction images into an infrared splicing image, and calculating the coordinate supplement values $X_{add}$ and $Y_{add}$ In the process of determining the overlap area of the two adjacent local reconstruction images, it is easier to guarantee the horizontal positions of the infrared thermal imaging camera and the detecting subject, i.e. the large-size composite material due to few horizontal influencing factors in the recording of the infrared thermal imaging camera, so a defect in different local reconstruction images has the same size. However, due to the limit that the distance between the infrared thermal imaging camera and the detecting subject can't be accurately adjusted, the different local reconstruction images have certain rotation angles and height changes. Therefore, the present invention uses an affine transformation matrix H to perform image registration for two adjacent local reconstruction images with overlap area, the details are described as follows:

Taking a local reconstruction image as reference image $I_1$, and an adjacent local reconstruction image which has overlap area with reference image $I_1$ as registration image $I_2$, putting reference image $I_1$ and registration image $I_2$ into a world coordinate system, and then splicing reference image $I_1$ with registration image $I_2$ by using an affine transformation matrix H to obtain an infrared splicing image $I_{12}$, where the size of reference image $I_1$ and registration image $I_2$ is the same: the width is m pixels, the height is n pixels;

where affine transformation matrix H is:

$$H = \begin{bmatrix} o_1 & o_2 & o_3 \\ o_4 & o_5 & o_6 \\ 0 & 0 & 1 \end{bmatrix}$$

where $o_1$, $o_2$, $o_3$, $o_4$, $o_5$, $o_6$ are the coefficients which are determined by pairs of matching pixels of reference image $I_1$ and registration image $I_2$.

Calculating inverse matrix $H^{-1}$ according to affine transformation matrix H, and denoted by:

$$H^{-1} = \begin{bmatrix} o'_1 & o'_2 & o'_3 \\ o'_4 & o'_5 & o'_6 \\ 0 & 0 & 1 \end{bmatrix};$$

where $o'_1$, $o'_2$, $o'_3$, $o'_4$, $o'_5$, $o'_6$ are the calculated coefficients.

Considering that there is no negative counting for coordinate of pixel and the world coordinate system in which a negative number is taken as origin may happen after affine transforming, we need to calculate the coordinate supplement values $X_{add}$ and $Y_{add}$ according to affine transformation matrix H and registration image $I_2$:

$X_{add}=0|X_{min}>0, X_{add}=X_{min}|X_{min}\leq 0$ $Y_{add}=0|Y_{min}>0, Y_{add}=Y_{min}|Y_{min}\leq 0$ where:

$$X_{min} = \min_x \left\{ \begin{bmatrix} o_1 & o_2 \\ o_4 & o_5 \end{bmatrix} \cdot \begin{bmatrix} x_{2\_1} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_1} \\ y_{2\_1} \end{bmatrix} + \begin{bmatrix} o_3 \\ o_6 \end{bmatrix} \right\}$$

$$Y_{min} = \min_y \left\{ \begin{bmatrix} o_1 & o_2 \\ o_4 & o_5 \end{bmatrix} \cdot \begin{bmatrix} x_{2\_m} \\ y_{2\_1} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_1} \\ y_{2\_1} \end{bmatrix} + \begin{bmatrix} o_3 \\ o_6 \end{bmatrix} \right\}$$

where $(x_{2\_1}, y_{2\_n})$ is the pixel coordinate at column 1 and row n of registration image $I_2$, $(x_{2\_1}, y_{2\_1})$ is pixel coordinate at column 1 and row 1 of registration image $I_2$, $(x_{2\_m}, y_{2\_1})$ is the pixel coordinate at column m and row 1 of registration image $$I_2, \min_x$$

denotes choosing the minimal x-coordinate from two pixel coordinates, $$\min_y$$

denotes choosing the minimal y-coordinate from two pixel coordinates.

Step S2.2: determining a search rectangle area

Calculating the maximum x-coordinate $X_{max}$ and the maximum x-coordinate $Y_{max}$ according to affine transformation matrix H and registration image $I_2$:

$$X_{max} = \max_x \left\{ \begin{bmatrix} o_1 & o_2 \\ o_4 & o_5 \end{bmatrix} \cdot \begin{bmatrix} x_{2\_m} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} \cdot \begin{bmatrix} x_{2\_m} \\ y_{2\_1} \end{bmatrix} ++ \begin{bmatrix} o_3 \\ o_6 \end{bmatrix} \right\}$$

$$Y_{max} = \max_y \left\{ \begin{bmatrix} o_1 & o_2 \\ o_4 & o_5 \end{bmatrix} \cdot \begin{bmatrix} x_{2\_m} \\ y_{2\_n} \end{bmatrix} + \begin{bmatrix} o_3 \\ o_6 \end{bmatrix}, \begin{bmatrix} o_1 & o_2 \\ o_4 & o_5 \end{bmatrix} * \begin{bmatrix} x_{2\_1} \\ y_{2\_n} \end{bmatrix} + \begin{bmatrix} o_3 \\ o_6 \end{bmatrix} \right\}$$

where $(x_{2\_m}, y_{2\_n})$ is the pixel coordinate at column m and row n of registration image $I_2$, $(x_{2\_m}, y_{2\_1})$ is the pixel coordinate at column m and row 1 of registration image $I_2$, $(x_{2\_1}, y_{2\_n})$ is the pixel coordinate at column 1 and row n of registration image $$I_2, \max_x$$

denotes choosing the maximal x-coordinate from two pixel coordinates, $$\max_y$$

denotes choosing the maximal y-coordinate from two pixel coordinates.

Judging and determining the values of four vertices: when $X_{min}>0$, then $X_{min}=1$, when $X_{min}\leq 0$, then $X_{min}=X_{min}$, when $Y_{min}>0$, then $Y_{min}=1$, when $Y_{min}\leq 0$, then $Y_{min}=Y_{min}$, when $X_{max}>m$, then $X_{max}=X_{max}$, when $X_{max}\leq m$, then $X_{max}=m$, when $Y_{max}>n$, then $Y_{max}=Y_{max}$, when $Y_{max}\leq n$, then $Y_{max}=n$;

Connecting the four vertices $(X_{max},Y_{max})$, $(X_{max},Y_{min})$, $(X_{min},Y_{max})$, $(X_{min},Y_{min})$ to form the search rectangle area;

Denoting the pixel values of infrared splicing image $I_{12}$ as:

$$I_{12}(x_{12\_i}, y_{12\_j}), i=1, \ldots, M, j=1, \ldots, N$$

$$M = \text{Round}(X_{max} - X_{min})$$

$$N = \text{Round}(Y_{max} - Y_{min})$$

where the width of infrared splicing image $I_{12}$ is M pixels, the height of infrared splicing image $I_{12}$ is N pixels, Round( ) is a function of rounding a number to the nearest integer.

Step S2.3: determining the three parts of the infrared splicing image

①. Transforming reference image $I_1$ and registration image $I_2$ to the search rectangle area: with the lower left corner as the origin, along the x-axis and y-axis, putting the pixel values $I_1(x_{1\_i}, y_{1\_j})$, $i=1, \ldots, m, j=1, \ldots, n$ of reference image $I_1$ into the search rectangle area, and extending reference image $I_1$ to the search rectangle area to obtain pixel values $I'_1(x_{1\_i}, y_{1\_j})$, $i=1, \ldots, M, j=1, \ldots, N$, where there is no pixel value on reference image $I_1$, 0 is added in; transforming the pixel values $I_2(x_{2\_i}, y_{2\_j})$, $i=1, \ldots, m, j=1, \ldots, n$ of registration image $I_2$ into the search rectangle area through the affine transformation of $H \cdot I_2(x_{2\_i}, y_{2\_j})$ to obtain pixel values $I'_2(x_{2\_i}, y_{2\_j})$, $i=1, \ldots, M, j=1, \ldots, N$, where there is no pixel value, 0 is added in;

②. Initializing $i=1, j=1$;

③. Judging whether both of pixel value $I'_1(x_{1\_i}, y_{1\_j})$ and pixel value $I'_2(x_{2\_i}, y_{2\_j})$ are non-zero values, if yes, pixel value $I_{12}(x_{12\_i}, y_{12\_j})$ of infrared splicing image $I_{12}$ is a pixel value of overlap area, if no, pixel value $I_{12}(x_{12\_i}, y_{12\_j})$ of infrared splicing image $I_{12}$ is not a pixel value of overlap area, $i = i+1$;

④. If $i>M$, then $j=j+1$ and returning step ③, or directly returning step ③, until $j>N$, thus all the pixel values of overlap area forms a overlap area denoted by $I_{12\_overlap}$;

Dividing infrared splicing image $I_{12}$ into three parts according to overlap area $I_{12\_overlap}$: overlap area $I_{12\_overlap}$, reference image area $I_{12\_1}$ and registration image area $I_{12\_2}$, where reference image area $I_{12\_1}$ is the part of reference area $I_1$ which does not belong to overlap area $I_{12\_overlap}$, registration image area $I_{12\_2}$ is the part of affine image $I'_2$ which does not belong to overlap area $I_{12\_overlap}$, affine image $I'_2$ is obtained through the following transformation:

$$\begin{bmatrix} x'_{2\_i'} \\ y'_{2\_j'} \end{bmatrix} = \begin{bmatrix} o_1 & o_2 \\ o_4 & o_5 \end{bmatrix} \cdot \begin{bmatrix} x_{2\_i} \\ y_{2\_j} \end{bmatrix} + \begin{bmatrix} o_3 \\ o_6 \end{bmatrix}$$

where $(x_{2\_i}, y_{2\_j})$ is the pixel coordinate at column i and row j of registration image $I_2$, $i=1,2,\ldots,m$, $j=1,2,\ldots,n$, $(x'_{2\_i'}, y'_{2\_j'})$ is the pixel coordinate at column i' and row j' of affine image $I'_2$.

The three parts of infrared splicing image $I_{12}$ are shown in FIG. 2.

Step S3: extracting the defect areas from infrared splicing image $I_{12}$

The accuracy of the quantitative assessment of morphological information at the defect location can be improved by clustering the pixels of infrared splicing image based on L*a*b color space and extracting the defect areas of maximum brightness, the details are described as follows:

Step S3.1: Transforming the pixel values (temperature characteristic values) of infrared splicing image $I_{12}$ from RGB color space to L*a*b color space;

Step S3.2: Clustering, retaining, discarding the pixels of infrared splicing image, performing morphological opening and closing operations to obtain defect areas:

Clustering the pixels of infrared splicing image $I_{12}$ into K clusters according to a* and b* color values, retaining the pixels of the cluster which has maximum L* (brightness), discarding the rest pixels; then performing morphological opening and closing operations on infrared splicing image $I_{12}$ to connect adjacent pixels to obtain defect areas $de_1, de_2, \ldots, de_P$, where P is the number of defect areas, for the $p^{th}$ defect area, its number of pixels is denoted by $N_p$.

Step S4: Quantitatively identifying the size of each defect area of infrared splicing image $I_{12}$ Through step S2, infrared splicing image $I_{12}$ is divided into three parts: overlap area $I_{12\_overlap}$, reference image area $I_{12\_1}$ which is the part of reference area $I_1$ that does not belong to overlap area $I_{12\_overlap}$, registration image area $I_{12\_2}$ which is the part of affine image $I'_2$ that does not belong to overlap area $I_{12\_overlap}$. Comparing the pixels of defect areas $de_1, de_2, \ldots, de_P$ obtained through step S3 with the coordinates of the three parts, the following three cases are obtained.

Figure 2A:
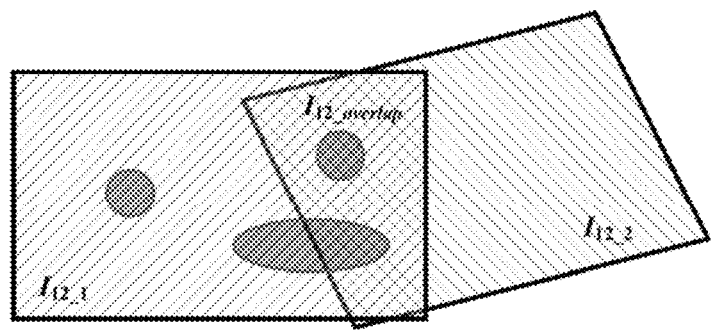
FIG. 2A~2C are diagrams of dividing an infrared splicing image into three parts in accordance with the present invention, where FIG. 2A corresponds to case 1, FIG. 2B corresponds to case 2, FIG. 2C corresponds to case 3.

Step S4.1: obtaining the actual number $NR_p$ of pixels of the $p^{th}$ defect area $de_p$ Case1: to the $p^{th}$ defect area $de_p$, as shown in FIG. 2A, if all is within reference image area $I_{12\_1}$, all is within overlap area $I_{12\_overlap}$, or one part is within reference image area $I_{12\_1}$ and the other part is within overlap area $I_{12\_overlap}$, then obtaining a conversion coordinates of pixels by using coordinate supplement values $X_{add}$ and $Y_{add}$:

$$\begin{bmatrix} x_{1\_p\_i''} \\ y_{1\_p\_j''} \end{bmatrix} = \begin{bmatrix} x_{12\_p\_i} + X_{add} \\ y_{12\_p\_j} + Y_{add} \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{1\_p\_i''}, y_{1\_p\_j''})$ is the corresponding conversion coordinate of pixel of the $p^{th}$ defect area $de_p$ on reference image $I_1$ at column i" and row j".

Figure 2B:
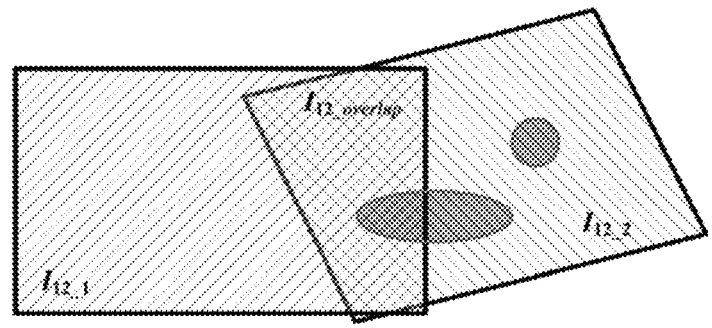

Case2: to the $p^{th}$ defect area $de_p$, as shown in FIG. 2B, if all is within registration image area $I_{12\_2}$, or one part is within registration image area $I_{12\_2}$ and the other part is within overlap area $I_{12\_overlap}$, then obtaining the corresponding conversion coordinates of pixels of the $p^{th}$ defect area $de_p$ on registration image $I_2$ by transforming the coordinates of pixels of the $p^{th}$ defect area $de_p$, where transforming the coordinates of pixels of the $p^{th}$ defect area $de_p$ is:

$$\begin{bmatrix} x_{2\_p\_i''} \\ y_{2\_p\_j''} \end{bmatrix} = \begin{bmatrix} o'_1 & o'_2 \\ o'_4 & o'_5 \end{bmatrix} \cdot \begin{bmatrix} x_{12\_p\_i} + X_{add} \\ y_{12\_p\_j} + Y_{add} \end{bmatrix} + \begin{bmatrix} o'_3 \\ o'_6 \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{2\_p\_i''}, y_{2\_p\_j''})$ is the corresponding conversion coordinate of pixel of the $p^{th}$ defect area $de_p$ on registration image $I_2$ at column i" and row j".

Figure 3:
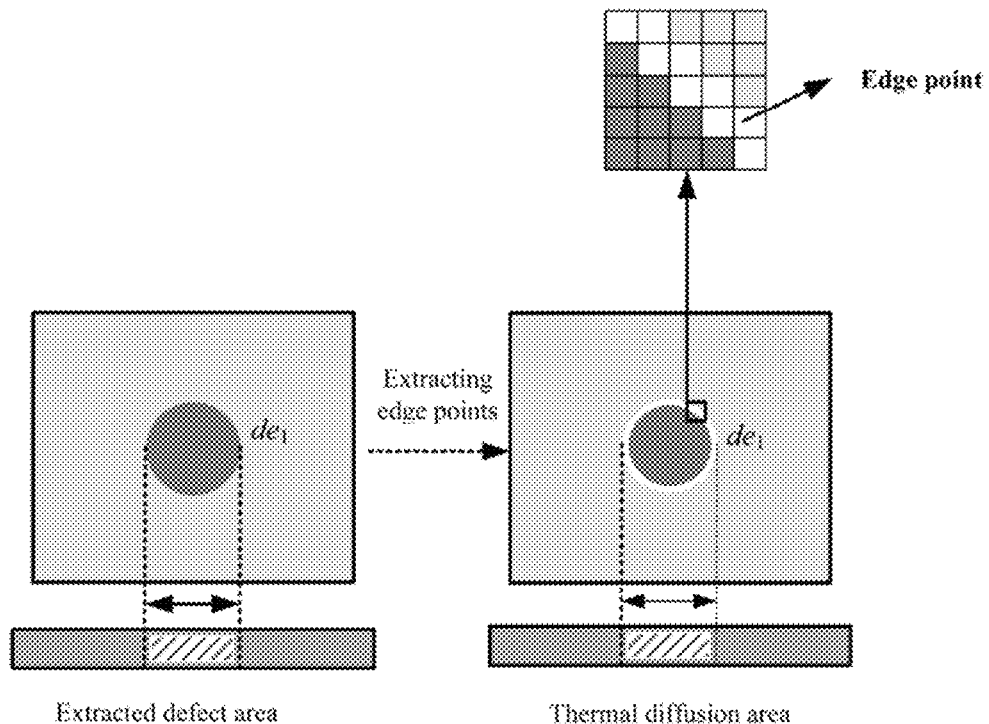
FIG. 3 is a diagram of extracting edge points of a defect area in accordance with the present invention.

As shown in FIG. 3, under the heat flux between defect and heat conduction area, the edge thermal diffusion effect will forms at the edge of a defect and be reflected in infrared image sequence, which makes the counting result of pixels of the defect area in defect reconstruction image inaccurate, i.e. the size of extracted defect area cannot correspond to the actual size of the defect. Therefore, we need to judge whether an edge point is a thermal diffusion point, and on this basis, to obtain the accurate size of a defect.

To case 1 and case 2: obtaining the $p^{th}$ defect area $de'_p$ on reference image $I_1$ or on registration image $I_2$ according the corresponding conversion coordinates of pixels of the $p^{th}$ defect area $de_p$; extracting the coordinates of pixels of the edge points from the $p^{th}$ defect area $de'_p$ to obtain a edge point coordinate set denoted by $c_p$;

obtaining the centroid coordinate $(x_{p\_cen}, y_{p\_cen})$ of the $p^{th}$ defect area $de'_p$ according to edge point coordinate set $c_p$, and then obtaining the corresponding transient thermal response curve $TTR_{p\_cen}$ from the corresponding infrared image sequence, according to the centroid coordinate $(x_{p\_cen}, y_{p\_cen})$ of the $p^{th}$ defect area $de'_p$;

obtaining the corresponding transient thermal response curve $TTR_{p\_q}$ from the corresponding infrared image sequence, according to the coordinate $(x_{p\_q}, y_{p\_q})$ of pixel of the edge point in edge point coordinate set $c_p$, q is the coordinate serial number, $q=1,2,\ldots,Q_p$, $Q_p$ is the number of the edge points in edge point coordinate set $c_p$;

to transient thermal response curve $TTR_{p\_cen}$ and transient thermal response curve $TTR_{p\_q}$, calculating the temperature change rate of each frame (time) to obtain temperature change sequence $\Delta V_{p\_cen}$ and temperature change sequence $\Delta V_{p\_q}$ respectively;

comparing the temperature change rates of temperature change sequence $\Delta V_{p\_cen}$ and temperature change sequence $\Delta V_{p\_q}$ at each frame to obtain a weighting factor sequence $VT_{p\_q}$, where the value $VT_{p\_q\_t}$ of $t^{th}$ frame is:

$$VT_{p\_q\_t}=|\Delta V_{p\_cen\_t},\Delta V_{p\_q\_t}|_{1,2,3}, t=1,2,\ldots,T-1$$

$$VT_{p\_q\_t}=1, t=T$$

where $\Delta V_{p\_cen\_t}$ is the value of temperature change sequences $\Delta V_{p\_cen}$ at $t^{th}$ frame, $\Delta V_{p\_q\_t}$ is the value of temperature change sequences $\Delta V_{p\_q}$ at $t^{th}$ frame; $|\Delta V_{p\_cen\_t},\Delta V_{p\_q\_t}|_{1,2,3}$ means:

if the difference between $\Delta V_{p\_cen\_t}$ and $\Delta V_{p\_q\_t}$ is less than a change threshold $\varepsilon_\Delta$, then the value $VT_{p\_q\_t}$ of $t^{th}$ frame is 1, if the difference between $\Delta V_{p\_cen\_t}$ and $\Delta V_{p\_q\_t}$ is not less than a change threshold $\varepsilon_\Delta$, and both of $\Delta V_{p\_cen\_t}$ and $\Delta V_{p\_q\_t}$ are positive or negative, then the value $VT_{p\_q\_t}$ of $t^{th}$ frame is 2, if the difference between $\Delta V_{p\_cen\_t}$ and $\Delta V_{p\_q\_t}$ is not less than a change threshold $\varepsilon_\Delta$, and $\Delta V_{p\_cen\_t}$ and $\Delta V_{p\_q\_t}$ have different signs, then the value $VT_{p\_q\_t}$ of $t^{th}$ frame is 3;

creating a weight sequence $\omega_p$ for the $p^{th}$ defect area $de'_p$, to the value $\omega_{p\_t}$ of weight sequence $\omega_p$ at $t^{th}$ frame, if the temperature of the corresponding frame at the corresponding transient thermal curve $TTR_{p\_q}$ is the maximum temperature, then the value $\omega_{p\_t}$ is 1.5, or is 1;

calculating the distance between transient thermal response curve $TTR_{p\_cen}$ and transient thermal response curve $TTR_{p\_q}$:

$$d_{p\_q} = \left[\sum_{t=1}^{T} \omega_{p\_t} \times VT_{p\_q\_t} \times |TTR_{p\_cen\_t} - TTR_{p\_q\_t}|^2\right]^{1/2}$$

where $TTR_{p\_cen\_t}$ is the value of transient thermal response curve $TTR_{p\_cen}$ at $t^{th}$ frame, $TTR_{p\_q\_t}$ is the value of transient thermal response curve $TTR_{p\_q}$ at $t^{th}$ frame;

finding out the maximum value from all distances $d_{p\_q}$, $q=1,2,\ldots,Q_p$, which is denoted by $d_{p\_max}$, then judging whether the distance $d_{p\_q}$ between transient thermal response curve $TTR_{p\_cen}$ and transient thermal response curve $TTR_{p\_q}$ is greater than $\varepsilon_{ttr} \times d_{p\_max}$, if yes, then the $q^{th}$ edge point of the $p^{th}$ defect area $de'_p$ is a thermal diffusion point, or is a defect point, where $\varepsilon_{ttr}$ is a distance coefficient which is greater than 1 and less than 1, $\varepsilon_{ttr} \times d_{p\_max}$ is a dynamic distance threshold;

counting up the number $NS_p$ of thermal diffusion points, and then obtaining the actual number $NR_p$ of pixels of the $p^{th}$ defect area $de_p$ of infrared splicing image $I_{12}$: $NR_p = N_p - NS_p$.

Figure 2C:
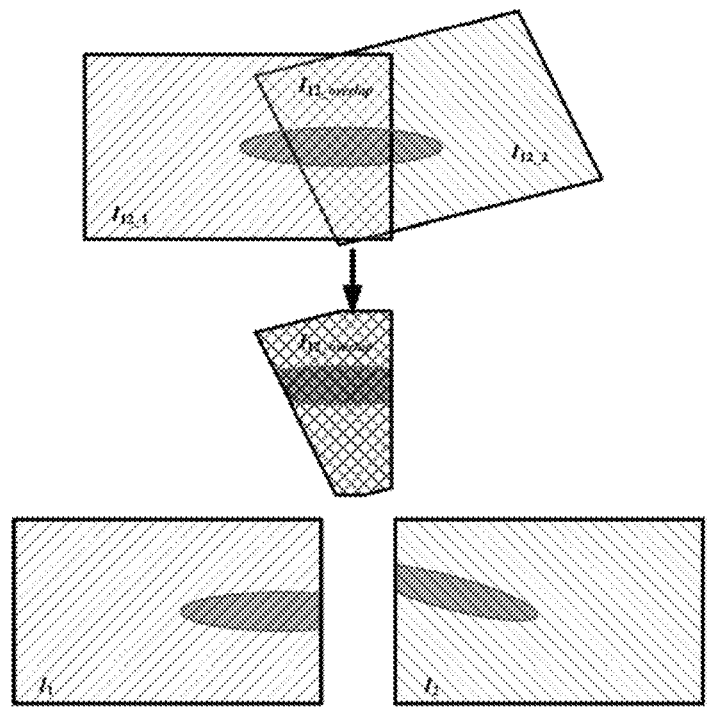
Figure 4:
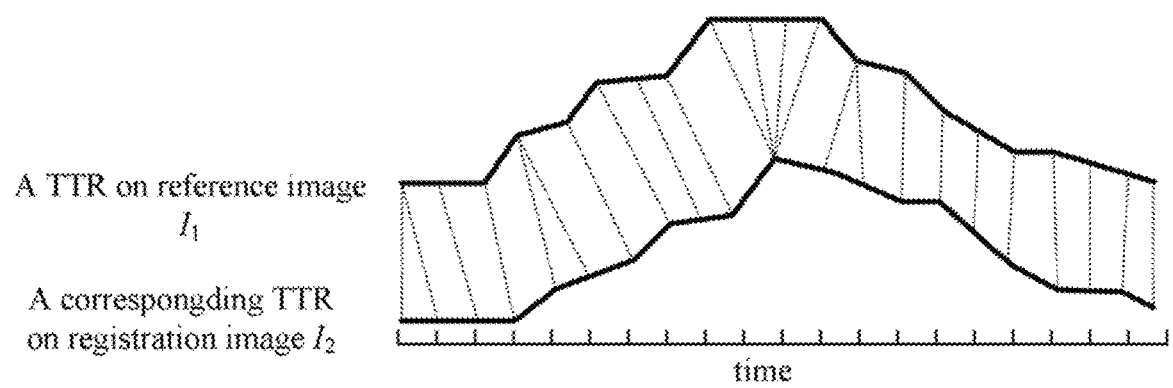
FIG. 4 is a diagram of two transient thermal response curves at the same location respectively obtained from a two different infrared image sequences.

Case 3: to the $p^{th}$ defect area, as shown in FIG. 2C, if it simultaneously locates on reference image area $I_{12\_1}$, on overlap area $I_{12\_overlap}$ and on registration image area $I_{12\_2}$, then:

Step S4.1.1: obtaining the conversion coordinates of the pixels within reference image area $I_{12\_1}$ and overlap area $I_{12\_overlap}$ as case 1, and then obtaining the number $NS_{p\_1}$ of thermal diffusion points on reference image $I_1$ as case 1 and case 2;

Step S4.1.2: obtaining the conversion coordinates of pixels within registration image area $I_{12\_2}$ and overlap area $I_{12\_overlap}$ as case 2, and then obtaining the number $NS_{p\_2}$ of thermal diffusion points on registration image $I_2$ as case 1 and case 2;

Step S4.1.3: obtaining the conversion coordinates of pixels within overlap area $I_{12\_overlap}$ as case 1, and then obtaining a plurality of transient thermal response curves through the infrared image sequence which corresponds to reference image $I_1$ according the conversion coordinates of pixels;

Step S4.1.4: obtaining the conversion coordinates of pixels within overlap area $I_{12\_overlap}$ as case 2, and then obtaining a plurality of transient thermal response curves through the infrared image sequence which corresponds to registration image $I_2$ according the conversion coordinates of pixels;

to the similarity of two transient thermal response curves, which are obtained from the same infrared image sequence, we can calculate their Euclidean distance, and take it as their similarity. However, the two transient thermal response curves, which are respectively obtained from two different infrared image sequences at the same location, are not corresponded along the same x axis. For the reason that the thermal conductivity and thermal resistance of the defect is not changed, as shown in FIG. 4, the two transient thermal response curves at the same location respectively obtained from a two different infrared image sequences have similar change, only different is that the times of corresponding change points are not consistent. Under this circumstance, the distance (similarity) of two transient thermal response curves cannot be effectively calculated by using the traditional Euclidean distance. Therefore, to solve this problem, it is needed that one transient thermal response curve is warped along the x axis to obtain consistent one-to-one match;

Step S4.1.5: calculating the similarity of the two transient thermal response curves which are respectively from the plurality of transient thermal response curves obtained in step S4.1.3 and the plurality of transient thermal response curves obtained in step S4.1.4 and correspond to the same location at overlap area $I_{12\_overlap}$ by using the dynamic time warping algorithm, if the similarity is greater than similarity threshold $SI_{threshold}$, then the corresponding pixel on overlap area $I_{12\_overlap}$ is a consistent pixel;

Step S4.1.6: counting the consistent pixels on overlap area $I_{12\_overlap}$ to obtain the number $NR_{p\_overlap}$ of the consistent pixels on overlap area $I_{12\_overlap}$, thus obtaining the number $NS_p$ of thermal diffusion points of the $p^{th}$ defect area $de_p$ of infrared splicing image $I_{12}$:

$$NS_p = \text{Round}\left(\frac{NS_{p\_1} + NS_{p\_2}}{1 + NR_{p\_overlap}/(N_p - (_{org}NR_{p\_overlap} - NR_{p\_overlap}))}\right)$$

where $_{org}NR_{p\_overlap}$ is the number of the pixels of of the $p^{th}$ defect area $de_p$ on overlap area $I_{12\_overlap}$;

obtaining the actual number $NR_p$ of pixels of the $p^{th}$ defect area $de_p$ of infrared splicing image $I_{12}$: $NR_p = N_p - NS_p$.

Step S4.2: calculating the size $S_p$ of the $p^{th}$ defect area $de_p$:

$$S_p = NR_p \times \frac{L \times B}{P_x \times P_y}$$

where L is the width of detection area, B is the height of detection area, $P_x$ is the number of pixels along the width direction of image, $P_y$ is the number of pixels along the height direction of image.

Step S4.3: processing all P defect areas according the step S4.1~S4.2), thus the sizes $S_1, S_2, \ldots, S_P$ of P defect areas $de_1, de_2, \ldots, de_P$ are obtained, the identification of quantitative size of defects are completed.

EXAMPLE

Figure 5A:
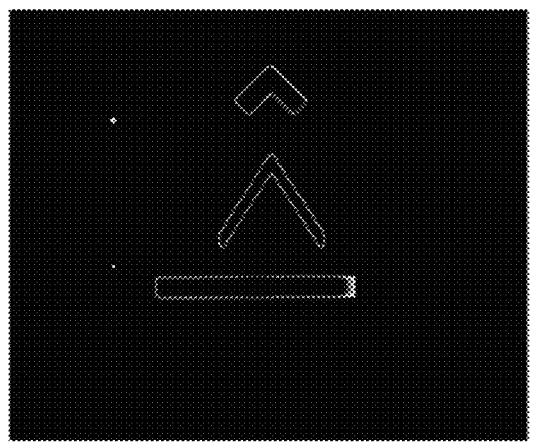
FIG. 5A~5C are illustrations of splicing in accordance with the present invention, where
Figure 5B:
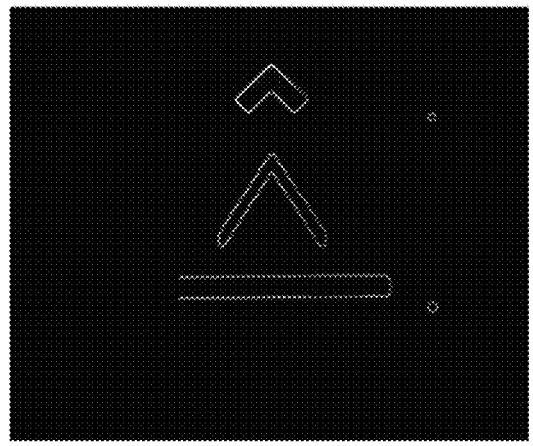
Figure 5C:
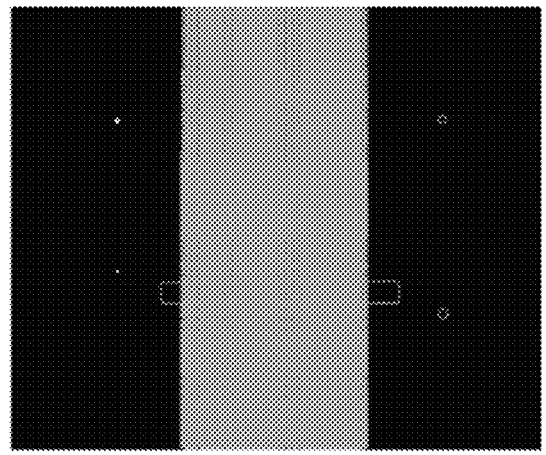

In this example, we perform two local detection on a specimen of a large-size composite material, there have a certain overlap area between the two local detection. Reconstructing the two infrared image sequences obtained by the two detections, two local reconstruction images are obtained. One is taken as reference image $I_1$, the other is taken as registration image $I_2$, and both are putted into a world coordinate system. Then, splicing reference image $I_1$ with registration image $I_2$ by using an affine transformation matrix H, an infrared splicing image $I_{12}$ is obtained by using an affine transformation matrix H. As shown in FIG. 5A~5C, FIG. 5A is a reference image, FIG. 5B is a registration image, FIG. 5C is an infrared splicing image, where in FIG. 5C, the middle rectangle part is overlap area $I_{12\_overlap}$, the left part is reference image area $I_{12\_1}$, the right part is registration image area $I_{12\_2}$.

In this example, affine transformation matrix H is:

$$H = \begin{bmatrix} 1.0078 & -0.0018 & 249.3701 \\ -0.0085 & 0.9997 & -1.5500 \\ 0 & 0 & 1 \end{bmatrix}.$$

Affine transformation matrix H is a homography transformation matrix, its inverse matrix is also a homography transformation matrix. In this example, the inverse matrix $H^{-1}$ of affine transformation matrix H is:

$$H^{-1} = \begin{bmatrix} 0.9923 & 0.0017 & -247.4376 \\ 0.0084 & 1.0004 & -0.5520 \\ 0 & 0 & 1 \end{bmatrix}.$$

In this example, $X_{max}=758.5277$, $X_{min}=1$, $Y_{max}=640$, $Y_{min}=-5.3680$, the search rectangle area is (758.5277, 640), (758.5277,−5.3680), (1,640), (1, −5.3680).

In this example, the number of pixels of overlap area $I_{12\_overlap}$ is 166868.

Figure 6A:
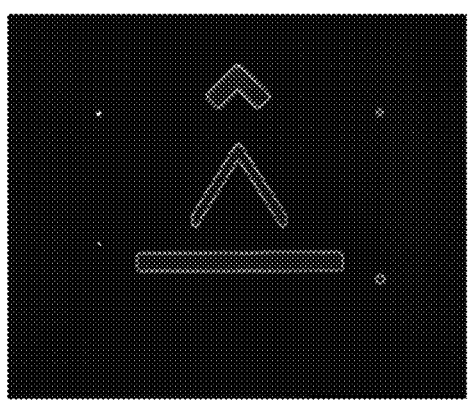
FIG. 6A~6B are comparison illustrations of the infrared splicing images before and after clustering, retaining and discarding in accordance with the present invention, where
Figure 6B:
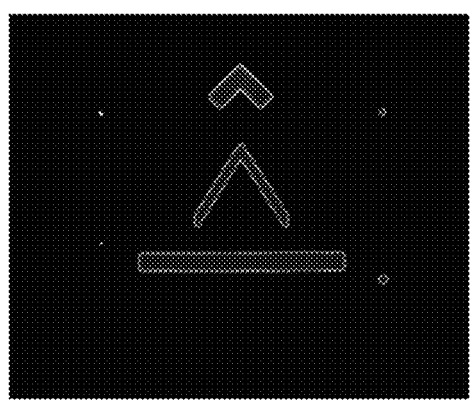
Figure 7:
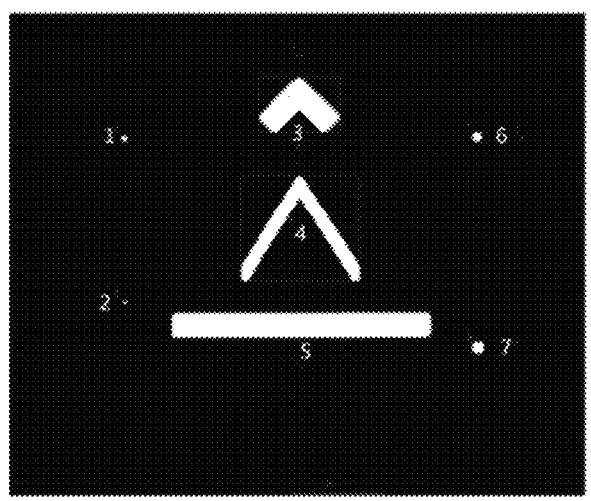
FIG. 7 is an illustration of a defect areas image in accordance with the present invention.

In this example, the images of infrared splicing image $I_{12}$ before and after clustering, retaining and discarding are shown in FIG. 6A and FIG. 6B. As can be seen from FIG. 6A and FIG. 6B, the extracting result of defect areas of infrared splicing image $I_{12}$ is satisfactory. The infrared splicing image $I_{12}$ after the extraction (defect area image) is taken as new processing object to perform morphological opening and closing operations: performing binaryzation processing on the defect area image to identify the defect areas as white, after morphological opening and closing operations, a plurality of connected areas are formed, the defect areas $de_1, de_2, \ldots, de_P$ are obtained. In this example, as shown in FIG. 7, the number of the defect areas P=7.

Figure 8A:
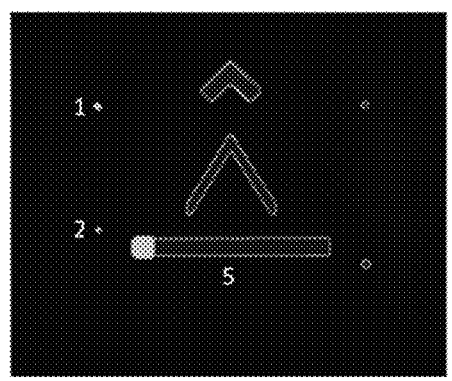
FIG. 8A~8C are illustrations of the defect areas belong to in accordance with the present invention, where
Figure 8B:
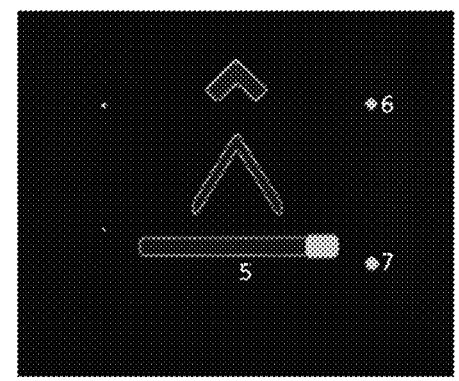
Figure 8C:
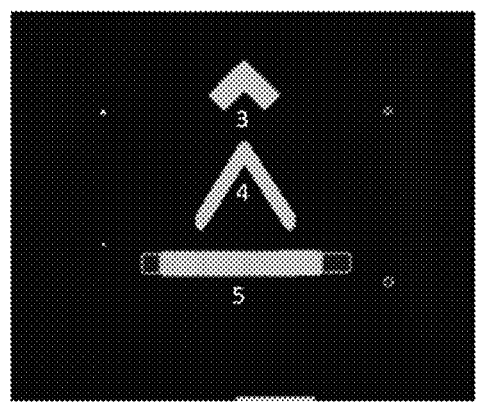

The results that the defect areas belong to according to the three parts of infrared splicing image $I_{12}$ are shown in FIG. 8A~8C, and the part(s) that each defect area belongs to are shown in table 1.

TABLE 1

| Defect area | Serial number in FIG. 8A~8C | Part(s) in infrared splicing image $I_{12}$ |
|---|---|---|
| $de_1$ | 1 | $I_{12\_1}$ |
| $de_2$ | 2 | $I_{12\_1}$ |
| $de_3$ | 3 | $I_{12\_overlap}$ |
| $de_4$ | 4 | $I_{12\_overlap}$ |
| $de_5$ | 5 | $I_{12\_1}$, $I_{12\_overlap}$, $I_{12\_2}$ |
| $de_6$ | 6 | $I_{12\_2}$ |
| $de_7$ | 7 | $I_{12\_2}$ |

As shown in FIG. 8A~8C, defect area (defect) $de_5$ simultaneously locates on reference image area $I_{12\_1}$, on overlap area $I_{12\_overlap}$ and on registration image area $I_{12\_2}$, which belongs to case 3. At this circumstance, to the determination of number of thermal diffusion points, it is needed to obtain the number $NS_{p\_1}$ of thermal diffusion points on reference image $I_1$, the number $NS_{p\_2}$ of thermal diffusion points on registration image $I_2$ and consider number $NR_{p\_overlap}$ of the consistent pixels on overlap area $I_{12\_overlap}$.

Figure 9A:
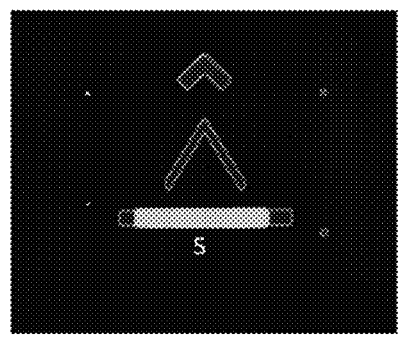
FIG. 9A~9C are illustrations of transforming the coordinates of the pixels within overlap area, where
Figure 9B:
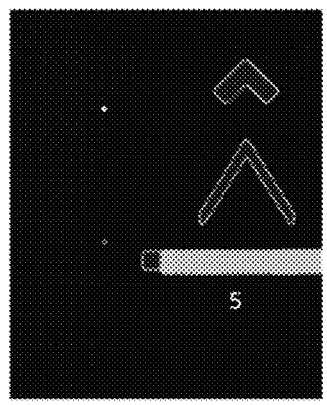
Figure 9C:
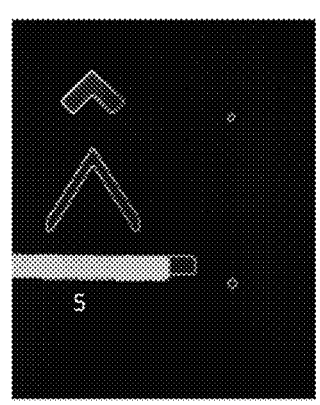

As shown in FIG. 9A~9C, to defect area (defect) $de_5$, the pixels of $_{org}NR_{p\_overlap}=8730$ within overlap area $I_{12\_overlap}$ (shown in FIG. 9A) are respectively transformed into reference image $I_1$ (shown in FIG. 9B) and registration image $I_2$ (shown in FIG. 9C), and then transient thermal response curves at the corresponding locations of the corresponding infrared image sequences are obtained. For the two transient thermal response curves at the same location, their similarity is obtained by using the dynamic time warping algorithm. If their similarity is greater than similarity threshold $SI_{threshold}$, then the corresponding pixel on overlap area $I_{12\_overlap}$ is a consistent pixel. By counting the consistent pixels on overlap area $I_{12\_overlap}$, the number $NR_{5\_overlap}=8130$ of the consistent pixels on overlap area $I_{12\_overlap}$ is obtained.

To defect area (defect) $de_5$, its number $N_5$ of pixels is 11394, the number $NS_{5\_1}$ of thermal diffusion points on reference image $I_1$ is 228 (the dynamic distance threshold is 346.2116), the number $NS_{5\_2}$ of thermal diffusion points on registration image $I_2$ is 237 (the dynamic distance threshold is 598.1519). Thus, the number $NS_5$ of thermal diffusion points of the $5^{th}$ defect area $de_5$ of infrared splicing image $I_{12}$ is:

$$NS_s = \text{Round}\left(\frac{NS_{5\_1} + NS_{5\_2}}{1 + NR_{5\_overlap}/(N_5 - (_{org}NR_{5\_overlap} - NR_{5\_overlap}))}\right) =$$

$$\text{Round}\left(\frac{228 + 237}{1 + 8130/(11394 - (8730 - 8130))} = 265\right)$$

Thus, the actual number $NR_5$ of pixels of the $5^{th}$ defect area $de_s$ of infrared splicing image $I_{12}$ is $$NR_5 = N_5 - NS_5 = 11394 - 265 = 11129$$

In this example, the defect areas $de_{1-4}$ belong to case 1, the defect areas $de_{6-7}$ belong to case 2, the actual numbers $NR_{1-4}$ and $NR_{6-7}$ of pixels of the defects are listed in table 2.

TABLE 2

| defect area | number of pixels of defect area $N_p$ | number of thermal diffusion points $NS_p$ dynamic distance threshold: $\varepsilon_{tr} \times d_{p\_max}$ | actual number pixels of defect area $NR_p$ |
|---|---|---|---|
| $de_1$ | 46 | 1 52.0766 | 45 |
| $de_2$ | 17 | 1 37.4789 | 16 |
| $de_3$ | 4089 | 7 55.5715 | 4082 |
| $de_4$ | 5295 | 61 174.1479 | 5234 |
| $de_6$ | 130 | 25 20.0233 | 105 |
| $de_7$ | 200 | 54 8.9148 | 146 |

In this example, the sizes of the defects are obtained according to the actual size of pixel, and listed in table 3.

TABLE 3

| Defect area (Defect) | Actual size | Number of pixels corresponding to actual area | Identified number of pixels | Identified size | Difference |
|---|---|---|---|---|---|
| $de_1$ | 19.63 mm² | 50.25 | 45 | 17.85 mm² | −1.78 mm² |
| $de_2$ | 7.07 mm² | 18.10 | 16 | 6.35 mm² | −0.72 mm² |
| $de_3$ | 1600 mm² | 4096 | 4082 | 1619.45 mm² | −19.45 mm² |
| $de_4$ | 2000 mm² | 5120 | 5234 | 2076.48 mm² | 76.48 mm² |
| $de_5$ | 4400 mm² | 11264 | 11129 | 4415.19 mm² | 15.19 mm² |
| $de_6$ | 38.48 mm² | 98.51 | 105 | 41.66 mm² | 3.18 mm² |
| $de_7$ | 63.16 mm² | 161.69 | 146 | 57.92 mm² | −5.24 mm² |

As can be seen from Table 3, the present invention of a method for quantitatively identifying the defects of large-size composite material based on infrared image sequence has realized the accurate identification of quantitative size of defects.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for quantitatively identifying the defects of large-size composite material based on infrared image sequence, comprising:

(1). obtaining a plurality of local reconstruction images of a large-size composite material based on a plurality of the infrared image sequences recorded by an infrared thermal imaging camera through a plurality of local detection;

(2). locating the overlap area of two adjacent local reconstruction images 2.1). splicing two adjacent local reconstruction images into an infrared splicing image, and calculating the coordinate supplement values $X_{add}$ and $Y_{add}$ taking a local reconstruction image as reference image $I_1$, and an adjacent local reconstruction image which has overlap area with reference image $I_1$ as registration image $I_2$, putting reference image $I_1$ and registration image $I_2$ into a world coordinate system, and then splicing reference image $I_1$ with registration image $I_2$ by using an affine transformation matrix H to obtain an infrared splicing image $I_{12}$, where the size of reference image $I_1$ and registration image $I_2$ is the same: the width is m pixels, the height is n pixels;

where affine transformation matrix H is:

$$H = \begin{bmatrix} o_1 & o_2 & o_3 \\ o_4 & o_5 & o_6 \\ 0 & 0 & 1 \end{bmatrix};$$

where $o_1$, $o_2$, $o_3$, $o_4$, $o_5$, $o_6$ are the coefficients which are determined by pairs of matching pixels of reference image $I_1$ and registration image $I_2$;

calculating inverse matrix $H^{-1}$ according to affine transformation matrix H, and denoted by:

$$H^{-1} = \begin{bmatrix} o'_1 & o'_2 & o'_3 \\ o'_4 & o'_5 & o'_6 \\ 0 & 0 & 1 \end{bmatrix};$$

where $o'_1$, $o'_2$, $o'_3$, $o'_4$, $o'_5$, $o'_6$ are the calculated coefficients;

calculating the coordinate supplement values $X_{add}$ and $Y_{add}$ according to affine transformation matrix H and registration image $I_2$:

$$X_{add}=0|X_{min}>0, X_{add}=X_{min}|X_{min}\leq 0$$

$$Y_{add}=0|Y_{min}>0, Y_{add}=Y_{min}|Y_{min}\leq 0$$

where:

$$X_{min} = \min_{x}\left\{\begin{bmatrix} o_1 & o_2 \\ o_4 & o_5 \end{bmatrix}\cdot\begin{bmatrix} x_{2\_1} \\ y_{2\_n} \end{bmatrix}+\begin{bmatrix} o_3 \\ o_6 \end{bmatrix}, \begin{bmatrix} o_1 & o_2 \\ o_4 & o_5 \end{bmatrix}\cdot\begin{bmatrix} x_{2\_1} \\ y_{2\_1} \end{bmatrix}+\begin{bmatrix} o_3 \\ o_6 \end{bmatrix}\right\}$$

$$Y_{min} = \min_{y}\left\{\begin{bmatrix} o_1 & o_2 \\ o_4 & o_5 \end{bmatrix}\cdot\begin{bmatrix} x_{2\_m} \\ y_{2\_1} \end{bmatrix}+\begin{bmatrix} o_3 \\ o_6 \end{bmatrix}, \begin{bmatrix} o_1 & o_2 \\ o_4 & o_5 \end{bmatrix}\cdot\begin{bmatrix} x_{2\_1} \\ y_{2\_1} \end{bmatrix}+\begin{bmatrix} o_3 \\ o_6 \end{bmatrix}\right\}$$

where $(x_{2\_1}, y_{2\_n})$ is the pixel coordinate at column 1 and row n of registration image $I_2$, $(x_{2\_1}, y_{2\_1})$ is pixel coordinate at column 1 and row 1 of registration image $I_2$, $(x_{2\_m}, y_{2\_1})$ is the pixel coordinate at column m and row 1 of registration image $$I_2, \min_{x}$$

denotes choosing the minimal x-coordinate from two pixel coordinates, $$\min_{y}$$

denotes choosing the minimal y-coordinate from two pixel coordinates;

2.2). determining a search rectangle area calculating the maximum x-coordinate $X_{max}$ and the maximum x-coordinate $Y_{max}$ according to affine transformation matrix H and registration image $I_2$:

$$X_{max} = \max_{x}\left\{\begin{bmatrix} o_1 & o_2 \\ o_4 & o_5 \end{bmatrix}\cdot\begin{bmatrix} x_{2\_m} \\ y_{2\_n} \end{bmatrix}+\begin{bmatrix} o_3 \\ o_6 \end{bmatrix}, \begin{bmatrix} o_1 & o_2 \\ o_4 & o_5 \end{bmatrix}\cdot\begin{bmatrix} x_{2\_m} \\ y_{2\_1} \end{bmatrix}++\begin{bmatrix} o_3 \\ o_6 \end{bmatrix}\right\}$$

$$Y_{max} = \max_{y}\left\{\begin{bmatrix} o_1 & o_2 \\ o_4 & o_5 \end{bmatrix}\cdot\begin{bmatrix} x_{2\_m} \\ y_{2\_n} \end{bmatrix}+\begin{bmatrix} o_3 \\ o_6 \end{bmatrix}, \begin{bmatrix} o_1 & o_2 \\ o_4 & o_5 \end{bmatrix}*\begin{bmatrix} x_{2\_1} \\ y_{2\_n} \end{bmatrix}+\begin{bmatrix} o_3 \\ o_6 \end{bmatrix}\right\}$$

where $(x_{2\_m}, y_{2\_n})$ is the pixel coordinate at column m and row n of registration image $I_2$, $(x_{2\_m}, y_{2\_1})$ is the pixel coordinate at column m and row 1 of registration image $I_2$, $(x_{2\_1}, y_{2\_n})$ is the pixel coordinate at column 1 and row n of registration image $$I_2, \max_{x}$$

denotes choosing the maximal x-coordinate from two pixel coordinates, $$\max_{y}$$

denotes choosing the maximal y-coordinate from two pixel coordinates;

judging and determining the values of four vertices: when $X_{min}>0$, then $X_{min}=1$, when $X_{min}\leq 0$, then $X_{min}=X_{min}$, when $Y_{min}>0$, then $Y_{min}=1$, when $Y_{min}\leq 0$, then $Y_{min}=Y_{min}$, when $X_{max}>m$, then $X_{max}=X_{max}$, when $X_{min}\leq m$, then $X_{max}=m$, when $Y_{max}>n$, then $Y_{max}=Y_{max}$, when $Y_{max}\leq n$, then $Y_{max}=n$;

connecting the four vertices $(X_{max},Y_{max})$, $(X_{max},Y_{min})$, $(X_{min},Y_{max})$, $(X_{min},Y_{min})$ to form the search rectangle area;

denoting the pixel values of infrared splicing image $I_{12}$ as:

$$I_{12}(x_{12\_i}, y_{12\_j}), i=1,\ldots, M, j=1,\ldots, N$$

$$M = \text{Round}(X_{max} - X_{min})$$

$$N = \text{Round}(Y_{max} - Y_{min})$$

where the width of infrared splicing image $I_{12}$ is M pixels, the height of infrared splicing image $I_{12}$ is N pixels, Round( ) is a function of rounding a number to the nearest integer;

2.3). determining the three parts of the infrared splicing image

①. transforming reference image $I_1$ and registration image $I_2$ to the search rectangle area: with the lower left corner as the origin, along the x-axis and y-axis, putting the pixel values $I_1(x_{1\_i}, y_{1\_j}), i=1,\ldots, m, j=1,\ldots, n$ of reference image $I_1$ into the search rectangle area, and extending reference image $I_1$ to the search rectangle area to obtain pixel values $I'_1(x_{1\_i}, y_{1\_j})$, $i=1,\ldots, M, j=1,\ldots, N$, where there is no pixel value on reference image $I_1$, 0 is added in; transforming the pixel values $I_2(x_{2\_i}, y_{2\_j}), i=1,\ldots, m, j=1,\ldots, n$ of registration image $I_2$ into the search rectangle area through the affine transformation of $H\cdot I_2(x_{2\_i}, y_{2\_j})$ to obtain pixel values $I'_2(x_{2\_i}, y_{2\_j})$, $i=1,\ldots, M, j=1,\ldots, N$, where there is no pixel value, 0 is added in;

②. initializing $i=1, j=1$;

③. judging whether both of pixel value $I'_1(x_{1\_i}, y_{1\_j})$ and pixel value $I'_2(x_{2\_i}, y_{2\_j})$ are non-zero values, if yes, pixel value $I_{12}(x_{12\_i}, y_{12\_j})$ of infrared splicing image $I_{12}$ is a pixel value of overlap area, if no, pixel value $I_{12}(x_{12\_i}, y_{12\_j})$ of infrared splicing image $I_{12}$ is not a pixel value of overlap area, $i=i+1$;

④. if $i>M$, then $j=j+1$ and returning step ③, or directly returning step ③, until $j>N$, thus all the pixel values of overlap area forms a overlap area denoted by $I_{12\_overlap}$;

dividing infrared splicing image $I_{12}$ into three parts according to overlap area $I_{12\_overlap}$: overlap area $I_{12\_overlap}$, reference image area $I_{12\_1}$ and registration image area $I_{12\_2}$, where reference image area $I_{12\_1}$ is the part of reference area $I_1$ which does not belong to overlap area $I_{12\_overlap}$, registration image area $I_{12\_2}$ is the part of affine image $I'_2$ which does not belong to overlap area $I_{12\_overlap}$, affine image $I'_2$ is obtained through the following transformation:

$$\begin{bmatrix} x'_{2\_i'} \\ y'_{2\_j'} \end{bmatrix} = \begin{bmatrix} o_1 & o_2 \\ o_4 & o_5 \end{bmatrix} \cdot \begin{bmatrix} x_{2\_i} \\ y_{2\_j} \end{bmatrix} + \begin{bmatrix} o_3 \\ o_6 \end{bmatrix}$$

where $(x_{2\_i}, y_{2\_j})$ is the pixel coordinate at column i and row j of registration image $I_2$, i=1,2, ..., m, j=1,2, ..., n, $(x'_{2\_i'}, y'_{2\_j'})$ is the pixel coordinate at column i' and row j' of affine image $I'_2$;

(3). extracting the defect areas from infrared splicing image $I_{12}$ 3.1). transforming the pixel values of infrared splicing image $I_{12}$ from RGB color space to L*a*b color space;

3.2). clustering the pixels of infrared splicing image $I_{12}$ into K clusters according to a* and b* color values, retaining the pixels of the cluster which has maximum L* (brightness), discarding the rest pixels; then performing morphological opening and closing operations on infrared splicing image $I_{12}$ to connect adjacent pixels to obtain defect areas $de_1, de_2, \ldots, de_P$, where P is the number of defect areas, for the $p^{th}$ defect area, its number of pixels is denoted by $N_p$;

(4). quantitatively identifying the size of each defect area of infrared splicing image $I_{12}$ 4.1). obtaining the actual number $NR_p$ of pixels of the $p^{th}$ defect area $de_p$ case1: to the $p^{th}$ defect area $de_p$, if all is within reference image area $I_{12\_1}$, all is within overlap area $I_{12\_overlap}$, or one part is within reference image area $I_{12\_1}$ and the other part is within overlap area $I_{12\_overlap}$, then obtaining a conversion coordinates of pixels by using coordinate supplement values $X_{add}$ and $Y_{add}$:

$$\begin{bmatrix} x_{1\_p\_i''} \\ y_{1\_p\_j''} \end{bmatrix} = \begin{bmatrix} x_{12\_p\_i} + X_{odd} \\ y_{12\_p\_j} + Y_{odd} \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{1\_p\_i''}, y_{1\_p\_j''})$ is the corresponding conversion coordinate of pixel of the $p^{th}$ defect area $de_p$ on reference image $I_1$ at column i" and row j";

case2: to the $p^{th}$ defect area $de_p$, if all is within registration image area $I_{12\_2}$, or one part is within registration image area $I_{12\_2}$ and the other part is within overlap area $I_{12\_overlap}$, then obtaining the corresponding conversion coordinates of pixels of the $p^{th}$ defect area $de_p$ on registration image $I_2$ by transforming the coordinates of pixels of the $p^{th}$ defect area $de_p$, where transforming the coordinates of pixels of the $p^{th}$ defect area $de_p$ is:

$$\begin{bmatrix} x_{2\_p\_i''} \\ y_{2\_p\_j''} \end{bmatrix} = \begin{bmatrix} o'_1 & o'_2 \\ o'_4 & o'_5 \end{bmatrix} \cdot \begin{bmatrix} x_{12\_p\_i} + X_{odd} \\ y_{12\_p\_j} + Y_{odd} \end{bmatrix} + \begin{bmatrix} o'_3 \\ o'_6 \end{bmatrix}$$

where $(x_{12\_p\_i}, y_{12\_p\_j})$ is the pixel coordinate of the $p^{th}$ defect area $de_p$ of infrared splicing image $I_{12}$ at column i and row j, $(x_{2\_p\_i''}, y_{2\_p\_j''})$ is the corresponding conversion coordinate of pixel of the $p^{th}$ defect area $de_p$ on registration image $I_2$ at column i" and row j";

to case 1 and case 2: obtaining the $p^{th}$ defect area $de'_p$ on reference image $I_1$ or on registration image $I_2$ according the corresponding conversion coordinates of pixels of the $p^{th}$ defect area $de_p$; extracting the coordinates of pixels of the edge points from the $p^{th}$ defect area $de'_p$ to obtain a edge point coordinate set denoted by $c_p$;

obtaining the centroid coordinate $(x_{p\_cen}, y_{p\_cen})$ of the $p^{th}$ defect area $de'_p$ according to edge point coordinate set $c_p$, and then obtaining the corresponding transient thermal response curve $TTR_{p\_cen}$ from the corresponding infrared image sequence, according to the centroid coordinate $(x_{p\_cen}, y_{p\_cen})$ of the $p^{th}$ defect area $de'_p$;

obtaining the corresponding transient thermal response curve $TTR_{p\_q}$ from the corresponding infrared image sequence, according to the coordinate $(x_{p\_q}, y_{p\_q})$ of pixel of the edge point in edge point coordinate set $c_p$, q is the coordinate serial number, q=1,2, ..., $Q_p$, $Q_p$ is the number of the edge points in edge point coordinate set $c_p$;

to transient thermal response curve $TTR_{p\_cen}$ and transient thermal response curve $TTR_{p\_q}$, calculating the temperature change rate of each frame (time) to obtain temperature change sequence $\Delta V_{p\_cen}$ and temperature change sequence $\Delta V_{p\_q}$ respectively;

comparing the temperature change rates of temperature change sequence $\Delta V_{p\_cen}$ and temperature change sequence $\Delta V_{p\_q}$ at each frame to obtain a weighting factor sequence $VT_{p\_q}$, where the value $VT_{p\_q\_t}$ of $t^{th}$ frame is:

$$VT_{p\_q\_t} = |\Delta V_{p\_cen\_t} \Delta V_{p\_q\_t}|_{1,2,3}, t=1,2,\ldots,T-1$$

$$VT_{p\_q\_t} = 1, t=T$$

where $\Delta V_{p\_cen\_t}$ is the value of temperature change sequences $\Delta V_{p\_cen}$ at $t^{th}$ frame, $\Delta V_{p\_q\_t}$ is the value of temperature change sequences $\Delta V_{p\_q}$ at $t^{th}$ frame; $|\Delta V_{p\_cen\_t} \Delta V_{p\_q\_t}|_{1,2,3}$ means:

if the difference between $\Delta V_{p\_cen\_t}$ and $\Delta V_{p\_q\_t}$ is less than a change threshold $\varepsilon_\Delta$, then the value $VT_{p\_q\_t}$ of $t^{th}$ frame is 1, if the difference between $\Delta V_{p\_cen\_t}$ and $\Delta V_{p\_q\_t}$ is not less than a change threshold $\varepsilon_\Delta$, and both of $\Delta V_{p\_cen\_t}$ and $\Delta V_{p\_q\_t}$ are positive or negative, then the value $VT_{p\_q\_t}$ of $t^{th}$ frame is 2, if the difference between $\Delta V_{p\_cen\_t}$ and $\Delta V_{p\_q\_t}$ is not less than a change threshold $\varepsilon_\Delta$, and $\Delta V_{p\_cen\_t}$ and $\Delta V_{p\_q\_t}$ have different signs, then the value $VT_{p\_q\_t}$ of $t^{th}$ frame is 3;

creating a weight sequence $\omega_p$ for the $p^{th}$ defect area $de'_p$, to the value $\omega_{p\_t}$ of weight sequence $\omega_p$ at $t^{th}$ frame, if the temperature of the corresponding frame at the corresponding transient thermal curve $TTR_{p\_q}$ is the maximum temperature, then the value $\omega_{p\_t}$ is 1.5, or is 1;

calculating the distance between transient thermal response curve $TTR_{p\_cen}$ and transient thermal response curve $TTR_{p\_q}$:

$$d_{p\_q} = \left[ \sum_{t=1}^{T} \omega_{p\_t} \times VT_{p\_q\_t} \times |TTR_{p\_cen\_t} - TTR_{p\_q\_t}|^2 \right]^{1/2}$$

where $TTR_{p\_cen\_t}$ is the value of transient thermal response curve $TTR_{p\_cen}$ at $t^{th}$ frame, $TTR_{p\_q\_t}$ is the value of transient thermal response curve $TTR_{p\_q}$ at $t^{th}$ frame;

finding out the maximum value from all distances $d_{p\_q}$, q=1,2, ..., $Q_p$, which is denoted by $d_{p\_max}$, then judging whether the distance $d_{p\_q}$ between transient thermal response curve $TTR_{p\_cen}$ and transient thermal response curve $TTR_{p\_q}$ is greater than $\varepsilon_{tr} \times d_{p\_max}$, if yes, then the $q^{th}$ edge point of the $p^{th}$ defect area $de'_p$ is a thermal diffusion point, or is a defect point, where $\varepsilon_{ttr}$ is a distance coefficient which is greater than 1 and less than 1;

counting up the number $NS_p$ of thermal diffusion points, and then obtaining the actual number $NR_p$ of pixels of the $p^{th}$ defect area $de_p$ of infrared splicing image $I_{12}$: $NR_p=N_p-NS_p$;

case 3: to the $p^{th}$ defect area, if it simultaneously locates on reference image area $I_{12\_1}$, on overlap area $I_{12\_overlap}$ and on registration image area $I_{12\_2}$, then:

4.1.1). obtaining the conversion coordinates of the pixels within reference image area $I_{12\_1}$ and overlap area $I_{12\_overlap}$ as case 1, and then obtaining the number $NS_{p\_1}$ of thermal diffusion points on reference image $I_1$ as case 1 and case 2;

4.1.2). obtaining the conversion coordinates of pixels within registration image area $I_{12\_2}$ and overlap area $I_{12\_overlap}$ as case 2, and then obtaining the number $NS_{p\_2}$ of thermal diffusion points on registration image $I_2$ as case 1 and case 2;

4.1.3). obtaining the conversion coordinates of pixels within overlap area $I_{12\_overlap}$ as case 1, and then obtaining a plurality of transient thermal response curves through the infrared image sequence which corresponds to reference image $I_1$ according the conversion coordinates of pixels;

4.1.4). obtaining the conversion coordinates of pixels within overlap area $I_{12\_overlap}$ as case 2, and then obtaining a plurality of transient thermal response curves through the infrared image sequence which corresponds to registration image $I_2$ according the conversion coordinates of pixels;

4.1.5). calculating the similarity of the two transient thermal response curves which are respectively from the plurality of transient thermal response curves obtained in step 4.1.3 and the plurality of transient thermal response curves obtained in step 4.1.4 and correspond to the same location at overlap area $I_{12\_overlap}$ by using the dynamic time warping algorithm, if the similarity is greater than similarity threshold $SI_{threshold}$, then the corresponding pixel on overlap area $I_{12\_overlap}$ is a consistent pixel;

4.1.6). counting the consistent pixels on overlap area $I_{12\_overlap}$ to obtain the number $NR_{p\_overlap}$ of the consistent pixels on overlap area $I_{12\_overlap}$; thus obtaining the number $NS_p$ of thermal diffusion points of the $p^{th}$ defect area $de_p$ of infrared splicing image $I_{12}$:

$$NS_p = \text{Round}\left(\frac{NS_{p\_1}+NS_{p\_2}}{1+NR_{p\_overlap}/(N_p-(_{org}NR_{p\_overlap}-NR_{p\_overlap}))}\right)$$

where $_{org}NR_{p\_overlap}$ is the number of the pixels of the $p^{th}$ defect area $de_p$ on overlap area $I_{12\_overlap}$;

obtaining the actual number $NR_p$ of pixels of the $p^{th}$ defect area $de_p$ of infrared splicing image $I_{12}$: $NR_p=N_p-NS_p$;

4.2). calculating the size $S_p$ of the $p^{th}$ defect area $de_p$:

$$S_p = NR_p \times \frac{L \times B}{P_x \times P_y}$$

where L is the width of detection area, B is the height of detection area, $P_x$ is the number of pixels along the width direction of image, $P_y$ is the number of pixels along the height direction of image;

4.3). processing all P defect areas according the step 4.1)~4.2), thus the sizes $S_1, S_2, \ldots, S_P$ of P defect areas $de_1, de_2, \ldots, de_P$ are obtained, the identification of quantitative size of defects are completed.

* * * * *